(12) United States Patent
Fearon (10) Patent No.: US 12,291,878 B2
(45) Date of Patent: May 6, 2025

(54) INTERLOCKING BUILDING PANEL (71) Applicant: Clayton P. Fearon, Oakville (CA)

(72) Inventor: Clayton P. Fearon, Oakville (CA)

( * ) Notice: Subject to any disclaimer, the term of this patent is extended or adjusted under 35 U.S.C. 154(b) by 0 days.

(21) Appl. No.: 17/855,891

(22) Filed: Jul. 1, 2022

(65) Prior Publication Data

US 2023/0012225 A1    Jan. 12, 2023

(51) Int. Cl.
| | |
|---|---|
| E04B 2/00 | (2006.01) |
| B32B 3/06 | (2006.01) |
| B32B 3/30 | (2006.01) |
| B32B 7/12 | (2006.01) |
| E04F 15/18 | (2006.01) |

(52) U.S. Cl.
CPC .............. *E04F 15/187* (2013.01); *B32B 3/06* (2013.01); *B32B 3/30* (2013.01); *B32B 7/12* (2013.01); *E04F 15/185* (2013.01); *B32B 2307/7246* (2013.01); *B32B 2419/04* (2013.01); *E04F 2201/0138* (2013.01); *E04F 2201/023* (2013.01); *E04F 2201/043* (2013.01)

(58) Field of Classification Search
CPC .............. B32B 3/06; B32B 2307/7246; E04F 2201/0138
See application file for complete search history.

(56) References Cited

U.S. PATENT DOCUMENTS

| | | | | |
|---|---|---|---|---|
| 5,950,378 A | * | 9/1999 | Council ............... | E01C 13/045 52/180 |
| 6,918,215 B2 | | 7/2005 | Smith | |
| 8,146,319 B2 | * | 4/2012 | McIntosh .............. | E04F 15/203 52/506.07 |
| 8,596,207 B2 | * | 12/2013 | Dubois .............. | B65D 19/0002 108/57.26 |
| 9,803,376 B1 | * | 10/2017 | Deel ....................... | E04F 15/06 |
| 9,863,155 B2 | * | 1/2018 | Cerny ................... | E04F 15/225 |
| 2003/0154676 A1 | * | 8/2003 | Schwartz .......... | E04F 15/02138 52/592.1 |
| 2013/0086861 A1 | * | 4/2013 | Masanek, Jr. ........... | E01C 5/226 52/309.1 |
| 2014/0013694 A1 | | 1/2014 | Degiorgio et al. | |
| 2014/0242342 A1 | * | 8/2014 | Vandevoorde ........ | B32B 29/005 428/192 |
| 2014/0318071 A1 | * | 10/2014 | Bird ...................... | E04F 15/225 52/591.1 |

(Continued)

*Primary Examiner* — Basil S Katcheves
(74) *Attorney, Agent, or Firm* — KARCESKI IP LAW, PLLC (57) ABSTRACT

A construction panel for installation on a construction surface and interlocking connection to a another construction panel comprises a moisture barrier base to inhibit migration of moisture from the construction surface. The base has a pair of opposed first connector edges comprising a first pair of releasable mating elements, and a pair of opposed second connector edges comprising a second pair of releasable mating elements. A plurality of projections extend from the underside of the base for support and to permit air circulation and drainage of water between the base and the construction surface. In one embodiment, an upper panel having selected physical characteristics is attached to the base. The positioning of the first and second pairs of mating elements on the first and second pairs of connector edges enables the interconnection of entire or partial construction panels.

9 Claims, 7 Drawing Sheets

(56) References Cited

U.S. PATENT DOCUMENTS

| | | | |
|---|---|---|---|
| 2014/0338177 A1* | 11/2014 | Vermeulen | B23Q 7/00 |
| | | | 198/339.1 |
| 2014/0373472 A1 | 12/2014 | Plummer | |
| 2015/0050443 A1* | 2/2015 | Roy | E04C 2/246 |
| | | | 428/114 |
| 2015/0252563 A1* | 9/2015 | Cerny | E04B 5/43 |
| | | | 52/745.05 |
| 2015/0292216 A1* | 10/2015 | St-Laurent | E04F 15/02038 |
| | | | 52/588.1 |
| 2015/0292217 A1* | 10/2015 | Prati | B32B 21/02 |
| | | | 52/483.1 |
| 2016/0047129 A1* | 2/2016 | Bowers | E04F 15/22 |
| | | | 52/741.1 |
| 2016/0053496 A1* | 2/2016 | Sosnowski | B32B 7/12 |
| | | | 52/588.1 |
| 2018/0094442 A1* | 4/2018 | Barlow | E04F 15/187 |
| 2020/0277796 A1* | 9/2020 | De Rick | E04F 15/02038 |

* cited by examiner

PRIOR ART

INTERLOCKING BUILDING PANEL

CROSS-REFERENCE TO RELATED APPLICATION

This application claims the priority to Canada Patent Application 3,123,999, filed Jul. 6, 2021, the contents of which are incorporated herein by reference.

FIELD OF THE INVENTION

The present invention relates generally to interlocking building panels such as subflooring panels, flooring panels, wall panels and ceiling panels. More specifically the present invention relates to sub-flooring systems for installation directly over concrete pads or other building substrates in the building construction industry for newly constructed or renovated facilities.

BACKGROUND

US Patent Publication No. US 2014/0373472 teaches a subfloor panel having quick release connections along its edges. The sub floor panel is extruded, molded or cast from a composite material including thermoplastic materials mixed with other compatible ingredients selected to satisfy the requirements for the particular installation. The panel is constructed as a single work piece and is configured to connect to adjacent panels. The core of each panel forms a tongue extending outwardly along the first and third faces of the panel. The core of each panel forms grooves on the second and fourth faces of the panel. Each tongue may form a slide-fit connection with the groove of an adjacent panel.

US Patent Publication No. US 2014/0373472 teaches a floating sub-floor system comprising panel assemblies in which each panel assembly includes a surface panel adhered to a base panel. The widths 14, 24 of the surface panel 10 and base panel 20 are assembled together in an offset manner such that the top side 21 of the base panel 20 overhangs or protrudes out from the surface panel 10 along the full length of the surface panel 10 along the edge 142. Conversely when the base panel 20 is offset from the surface panel 10, the bottom side 13 of the surface panel 10 protrudes past the base panel 20 along full length 12 of the surface panel along the edge 140 opposite to the shiplap joint.

Figure 10:
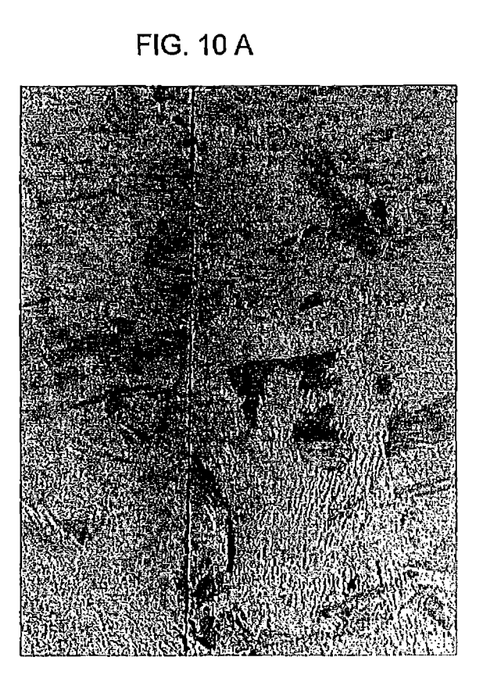
FIG. 10A is a PRIOR ART photograph of the top side of two prior art subfloor panels joined together.
FIG. 10B is a PRIOR ART photograph of the underside of the same two prior art subfloor panels joined together.

U.S. Pat. No. 6,918,215 teaches a floor panel for use in a sub-floor application. Floor panels embodying the teachings of said patent are available from AGT Products (IP) Inc. under the trademark DRICORP®. Each of the floor panels is constructed from an upper member of sheet flooring material and a lower member of polyethylene or other waterproof sheet material fixed to the upper member by an adhesive. The lower member is intended to provide a moisture barrier to prevent water seeping upward to damage the upper member and flooring materials such as hardwood or carpet which may be installed above the subfloor. The upper member and the lower member are assembled together in an offset manner so that edge portions of the surface panel extend beyond the base panel on two sides, and the edge portions of the surface panel are recessed relative to the base panel on the other two sides. Connection of two adjacent panels is achieved by placing the two panels side by side and tapping them laterally together to force the extended edges of one panel into the corresponding recesses of the other panel. Shiplap joints are created between the surface panels to form a continuous subfloor. Since joints are formed by the structure and position of the surface panels, the surface panels must be manufactured from materials which have sufficient physical strength and integrity to withstand being tapped into position and to resist shifting or breaking so as to maintain the joint. Photographs of this prior art subfloor illustrate a further structural problem with the use of joints formed by the surface panels. Prior art photograph FIG. 10A was taken looking down at the top surface of a joint between two DRICORE® subfloor panels. The joint between the two panels is visible running vertically (in the photo FIG. 10A) but appears to form a tight fit between the two panels. Prior art photograph FIG. 10B was taken looking at the bottom surface of the same two joined panels. Whereas the top view shows a relatively tight fit, the bottom view shows a significantly wider gap between the lower members at the position where the upper members form the shiplap joint. The gap between the lower members allows any water which may accumulate on the concrete building slab to be wicked up into the upper member at the joint between the panels. Moisture trapped in the upper member can cause rot to develop. Additionally moisture which breaches the gap between lower members can reach and damage flooring materials installed on top of the subfloor.

It is an object of the present invention to provide subfloor panels which, when joined, form a continuous sealed moisture barrier.

It is a further object to provide subfloor panels which can be quickly and easily joined together and separated again as needed to access the underlying concrete.

It is a further object to provide subfloor panels which do not rely on the strength and integrity of their surface panels in order to form joints.

It is yet another object of the present invention to provide subfloor panels which are more lightweight than conventional subfloor panels. It is a further object of the present invention to provide subfloor panels having selected physical characteristics including acoustic insulation, heat insulation, odor barriers, etc.

SUMMARY OF THE INVENTION

A construction panel is provided for interlocking connection to a second construction panel and installation on a construction surface. The construction panel comprises a base comprising a moisture barrier to inhibit migration of moisture from the construction surface. The base has a pair of opposed first connector edges and a pair of opposed second connector edges. The first pair of opposed connector edges comprise a first pair of releasable mating elements, and the second first pair of opposed connector edges comprise a second pair of releasable mating elements. The first pair of releasable mating elements comprises a ridge defined by the underside of one of the first pair of opposed connector edges, and a channel defined by the underside of the other of the first pair of opposed connector edges. The second pair of releasable mating elements comprises a ridge defined by the underside of one of the second pair of opposed connector edges, and a channel defined by the underside of the other of the second pair of opposed connector edges. The base further comprises a plurality of projections extending from the underside thereof to support the base and to permit free drainage of water about the projections and between the base and the construction surface.

In another embodiment an upper panel is attached to the base. The upper panel has a perimeter and defines a planar support surface. The first pair of opposed connector edges and the second pair of opposed connector edges extend outwardly beyond the perimeter of the upper panel. The upper pane is attached to the base by adhesive.

DETAILED DESCRIPTION

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

The present invention is construction panel for interlocking connection to a second construction panel and installation on a construction surface. It is expected that the most common use of construction panels according to the present invention will be subfloor panels for installation on a concrete construction slab or other construction material in a new building or renovation. By way of example, the invention is illustrated in the drawing figures as a sub-floor panel. Nevertheless, alternative embodiments of the construction panel such as decorative floor panels, wall panels, ceiling panels, and acoustic insulation panels are also contemplated within the scope of this invention. Other variations, modifications and embodiments of the invention will be apparent to those persons who are skilled in the art upon reading this description, claims and drawings.

Figure 1:
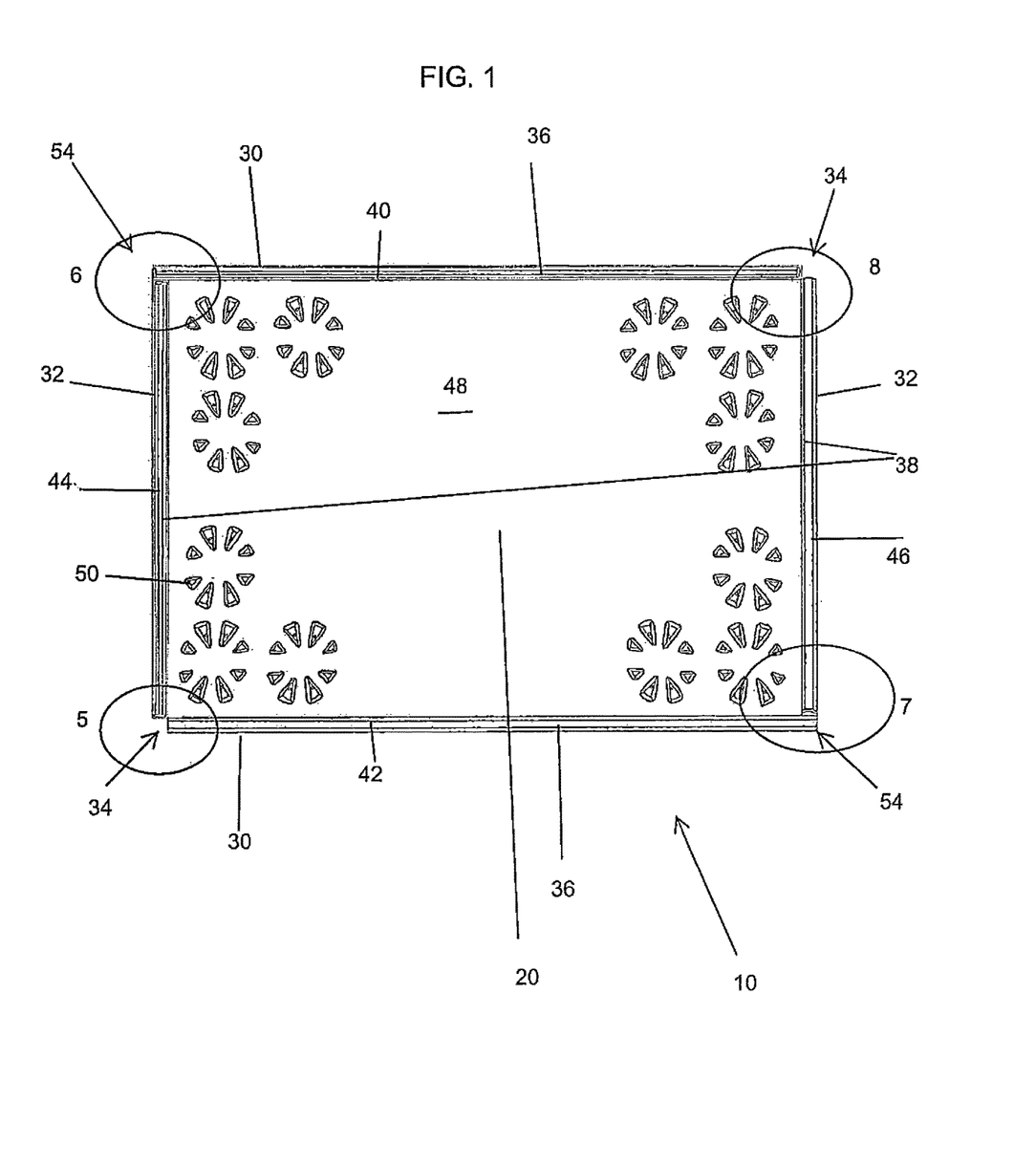
FIG. 1 is a bottom plan view showing the underside of a subfloor panel in accordance with the present invention.
Figure 2:
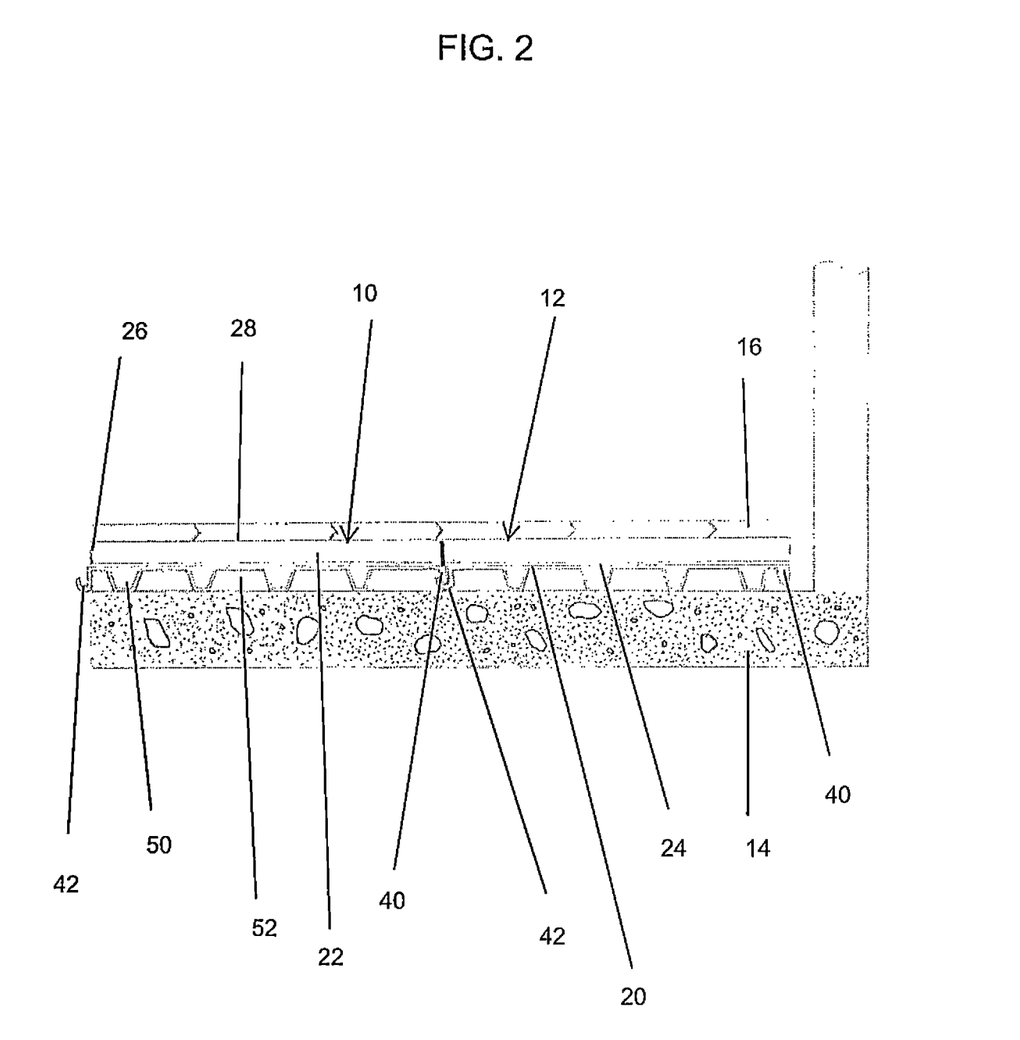
FIG. 2 is a partial cross section of two subfloor panels shown installed.
Figure 3:
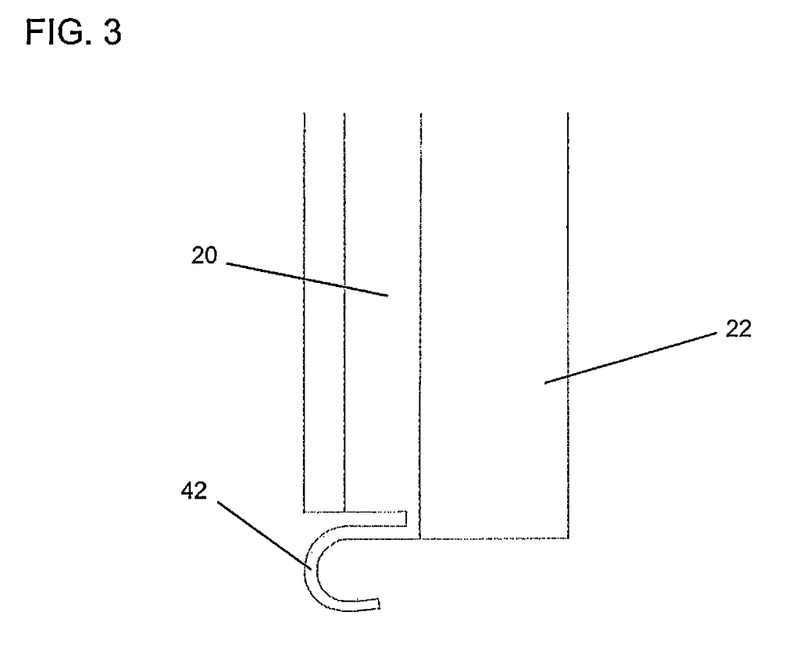
FIG. 3 is a first partial enlarged end view of a portion of a subfloor panel according to the present invention.
Figure 4:
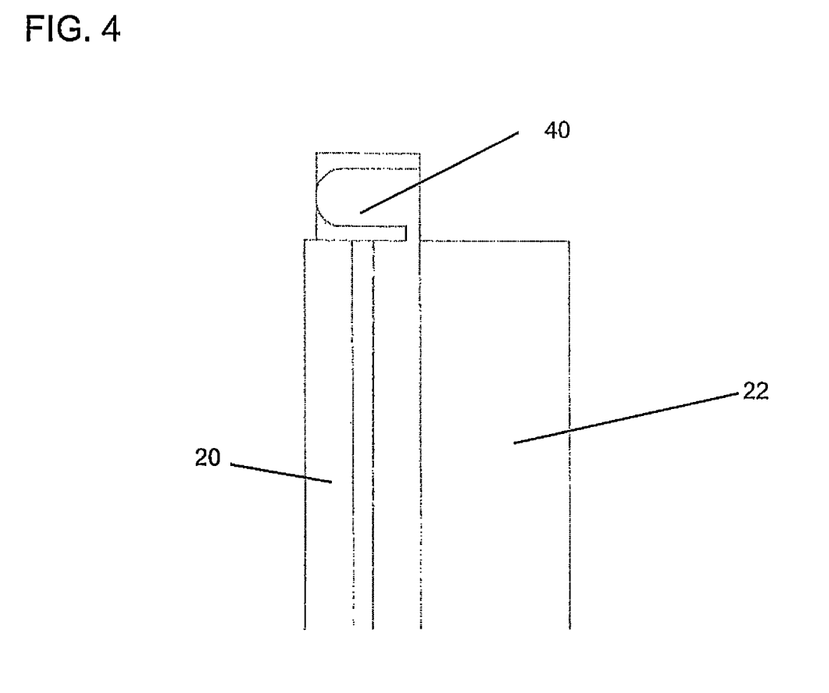
FIG. 4 is a second partial enlarged end view of a portion of a subfloor panel according to the present.

Turning now to FIG. 1 and FIG. 2, a construction panel 10 is shown for interlocking connection to a second construction panel 12 and installation on a construction surface 14. The construction panels 10 and 12 are shown in FIG. 2 as a sub-floor on a concrete building slab 14. Reference numeral 16 indicates a decorative flooring material such as engineered hardwood plank, vinyl click flooring, laminate flooring, carpeting etc. installed directly on top of the construction panels 10 and 12. The construction panel 10 has a base 20. The base 20 comprises a moisture barrier to inhibit the migration of moisture from the construction surface 14.

The base 20 is preferably substantially rigid. In order to function as a moisture barrier, the base is constructed from a moisture resistant material. It is preferred to construct the base from a material selected from the group consisting of plastic, HDPE (high density polyethylene), HDPP (high density polypropylene) rubber, PVC, and acrylonitrile butadiene styrene (ABS).

The base 20 defines a plurality of projections 50 which extend outward from the underside 48 of the base 20 to rest on the construction surface 14 so as to support the construction panel 10 and any decorative panel laid on top of the construction panel 10. The projections 50 are preferably flat bottomed for stable contact with the construction surface 14. When the projections 50 are in contact with the construction surface 14, open space 52 is maintained between the underside 48 of the base 20 and the construction surface 14. The open space 52 permits an moisture which accumulates on the construction surface 14 to be drained away and permits air circulation under the construction panel 10 to allow for the drying. The projections may be solid if additional weight bearing strength is required, or they may be hollow as seen in FIG. 2 to ensure a lightweight construction panel.

The base 20 has first pair of opposed connector edges 30, 30 and a second pair of opposed connector edges 32, 32. The first pair of opposed connector edges 30, 30 and the second pair of opposed connector edges each extend outwardly beyond the perimeter 26 of the upper panel 22. In FIG. 2 the relative positioning of the one of the first pair of connector edges 30 can be seen extending beyond the perimeter 26 of the upper layer 22. (Specifically channel 42 can be seen extending beyond perimeter 26 in FIG. 2). Although an upper panel 22 (discussed below) is not visible in FIG. 1, it should be understood that the perimeter of the upper layer does not extend outwardly as far as the connector edges. An open notch 34 can be seen between one of the first pair of connector edges 30 and one of the second pair of connector edges 32, confirming that the perimeter of the upper layer 22 does not extend as far as the connecting edges and is not visible in the notch 34.

The first pair of opposed connector edges 30, 30 comprise a first pair of releasable mating elements 36, 36. The releasable mating elements may be constructed to have a variety of suitable complementary profiles. In the embodiment illustrated in the drawings, the first pair of releasable mating elements 36 comprises a ridge 40 defined by the underside of one of the first pair of opposed connector edges 30 and a channel 42 defined in the underside of the other of the first pair of opposed connector edges 30. Thus one ridge 40 and one corresponding channel 42 are considered together to form one pair of releasable mating elements 36, 36. The second pair of mating elements 38, 38 comprises a ridge 44 defined on the underside of one of the second pair of opposed connector edges 32 and a channel 46 defined in the underside of the other of the second pair of connector edges 32. The ridge 44 and the channel 46 together form one pair of releasable mating elements 38, 38.

The use of pairs of mating elements constructed as complementary ridges and channels facilitates simple snapfit connections which do not require lateral sliding motions to engage together. Instead, adjacent construction panels can easily be connected by pressing the ridges of one panel downward into the channels of the adjacent panel. The result is a snap fit which does not require the use of a hammer or other tool to tap panels laterally into place. When using the ridge/channel mating elements there is connection along the entirety of both panel and the connection is easily verifiable.

Figure 5:
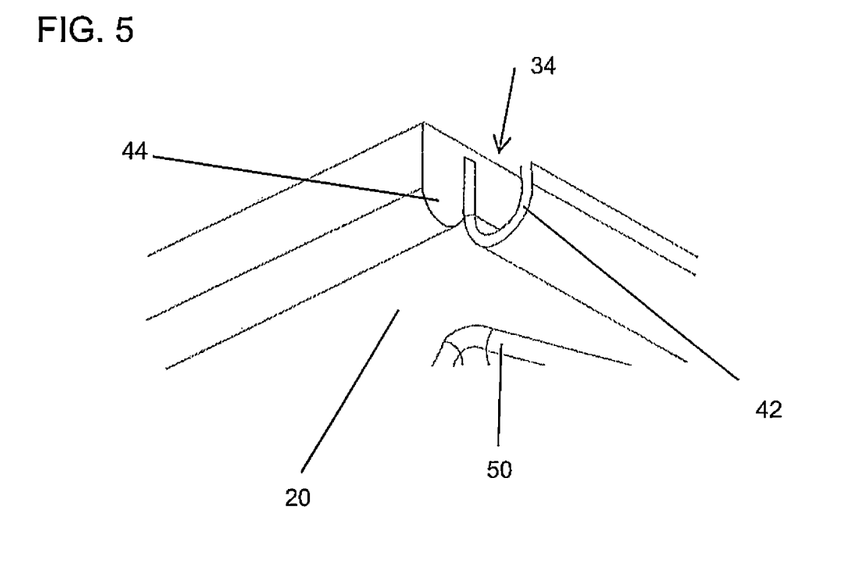
FIG. 5 is an enlarged perspective view of a portion indicated by the circle 5 of the underside of the subfloor panel of FIG. 1.
Figure 8:
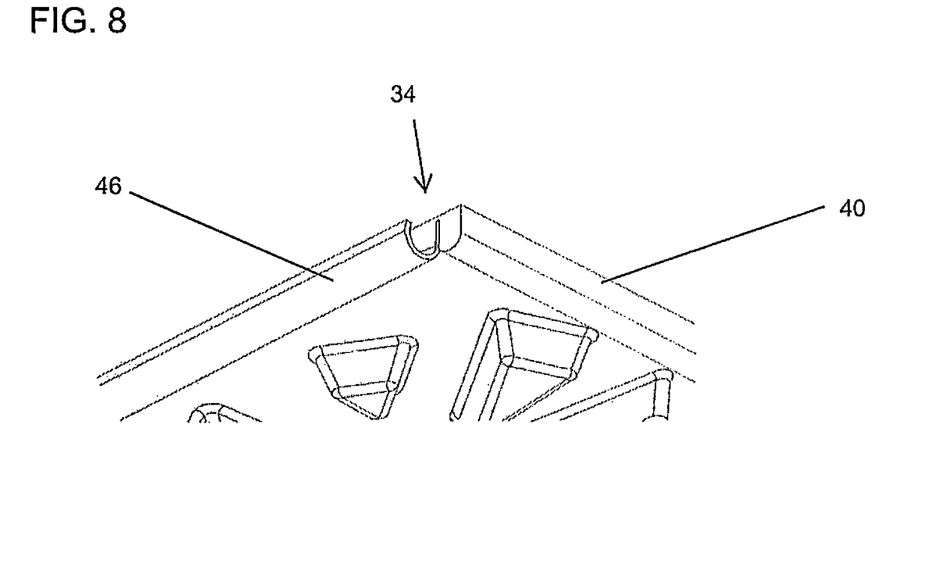
FIG. 8 is an enlarged perspective view of a portion indicated by the circle 8 of the underside of the subfloor panel of FIG. 1.

As can be seen in greater detail in FIG. 5 the contours of a ridge 44 and a channel 42 are complementary in size and orientation. A first end of the channel 42 defined on the underside of one of the first pair of the connector edges 30 is set back from the end of the ridge 44 defined on the underside of one of the adjacent pair of opposed connector edges 32 channel. The setback forms a notch 34 at the corner of the two adjacent connector edges 30, 32. Likewise, in FIG. 8, a first end of the channel 46 is cut back from the end of ridge 40 to form a notch 34. The notches 34, 34 are positioned on diagonally opposite corners of the base 20. The notches 34 provides clearances to allow for the installation and interconnection of adjacent construction panels.

Figure 6:
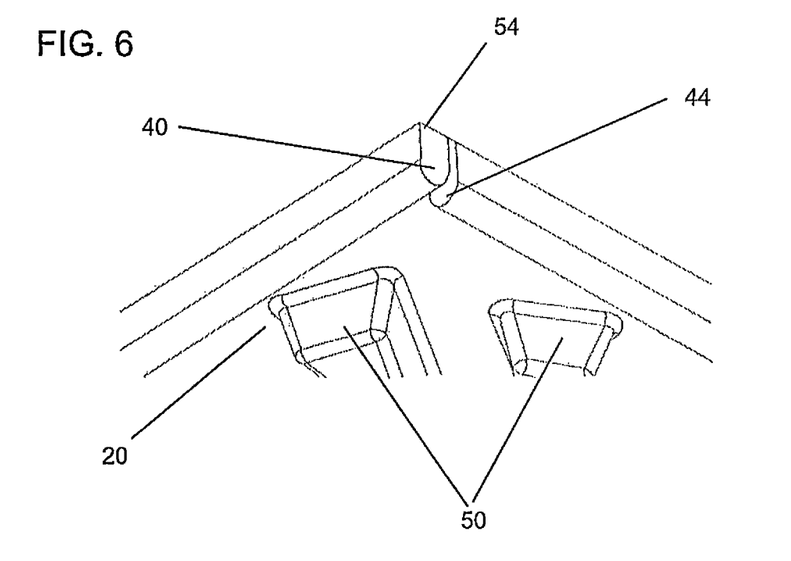
FIG. 6 is an enlarged perspective view of a portion indicated by the circle 6 of the underside of the subfloor panel of FIG. 1.
Figure 7:
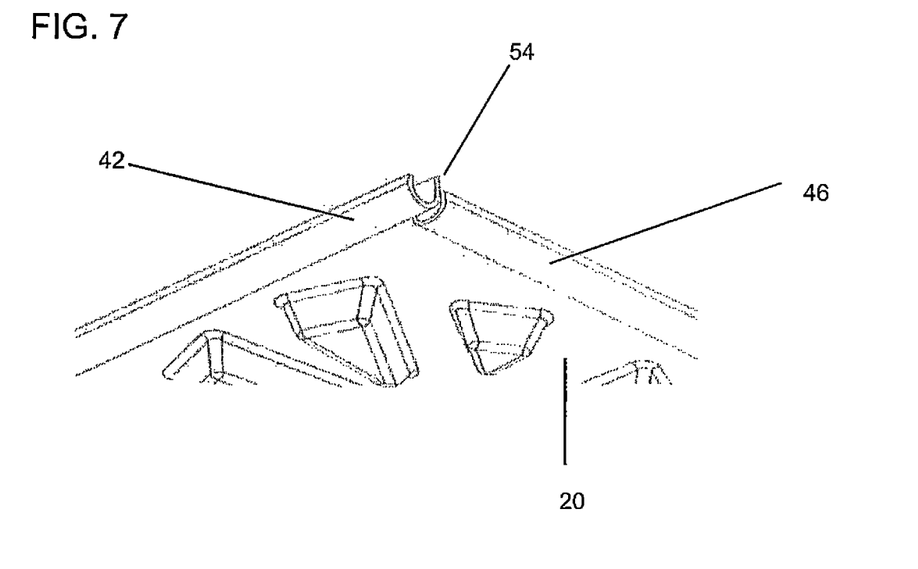
FIG. 7 is an enlarged perspective view of a portion indicated by the circle 7 of the underside of the subfloor panel of FIG. 1.

In FIG. 6 it can be seen that the contours of ridge 44 formed in one of connector edges 30 and the ridge 44 formed in the adjacent connector edges 32 meet flush and form a regular 90 degree outside angle 54. In FIG. 7 it can be seen that the contours of channel 42 formed in one of connector edges 30 and the channel 46 formed in the adjacent connector edges 32 meet flush and form a regular 90 degree outside angle 54.

Figure 9A:
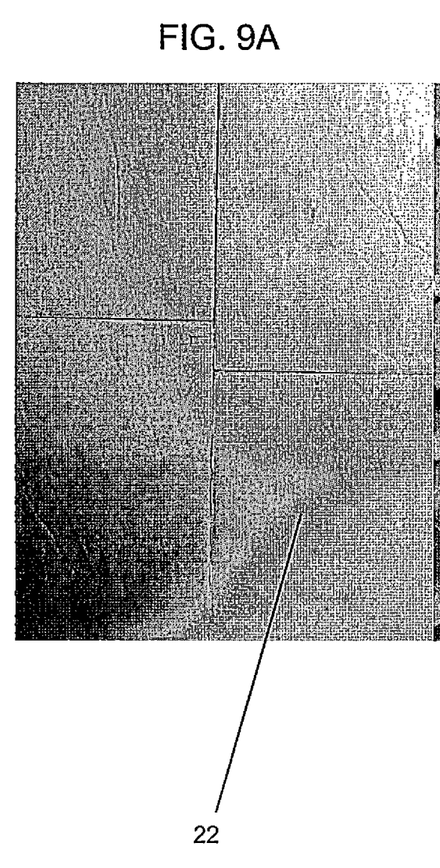
FIG. 9A is a photograph of the top side of portions of four subfloor panels joined together according to the present invention.
Figure 9B:
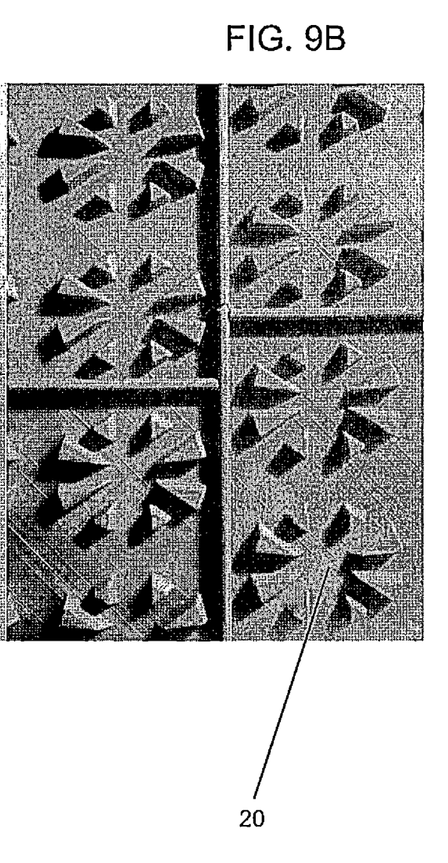
FIG. 9B is a photograph of the underside of portions of four subfloor panels joined together according to the present invention.

As seen in FIG. 1 the base 20 has a notched corners 34, 34 on two diagonally opposed corners and right angle corners 54, 54 on two diagonally opposed corners. When adjacent construction panels are connected to one another tight connections can be formed on all sides of the respective panels. In this manner, all construction panels may be connected together with no gaps between their respective bases. Connection is achieved by aligning the connector edges of one construction panel to overlap the connector edges of the adjacent panel and pressing downward to mate the respective pairs of mating elements. No tools are required to make the connection. FIG. 9B illustrates the tight connections which are formed between adjacent panels. A continuous moisture barrier with no gaps between adjacent bases is formed. The effectiveness of panels constructed according to the present invention can be understood by comparing FIG. 9A and FIG. 9B with the prior art photos A and B. In the prior art photo B the seams between the bottom members (moisture barrier) of adjacent panels are wide enough to see the fiberboard of the upper members. Keeping in mind that the joints between adjacent panels are formed by offsetting of the upper members, the joints would be directly exposed to any moisture which might accumulate on the construction surface. In FIG. 9B the seams between adjacent panels permit no gaps between the mating elements of the bases of the panels. There can be no exposure of the upper members to moisture from the construction surface since the bases form the sealed joints of the moisture barrier.

The positioning of the first pair of mating elements and the second pair of mating elements on the first and second pairs of connector edges enables the interconnection of entire construction panels or partial construction panels. This means that panels may be cut during installation to fit the dimensions of any selected floor area. The projections 50 which extend downward from the underside 48 of each base 20 to support it on a construction surface have no impact on the integrity of the connector edges or the mating elements used to connect panels. Accordingly, the panels can be cut at any position without regard to whether a cut line will pass through and any projection 50. After cutting to fit panels in a first row, the leftover portion of panels can be installed and interconnected in subsequent rows. When installing construction panels according to the present invention, it is preferred to avoid having four construction panels meet at a single intersection. Staggered joints between adjacent panels, as shown in FIG. 9B, are preferred to increase the rigidity of the joints.

It will be understood that a construction panel 10 constructed with base 20 as described above functions as a moisture barrier without the addition of any other structural components. A decorative flooring material could be installed directly on base 20 in accordance with an embodiment of the present invention. Nevertheless, construction panels 10 according to the present invention may, in another embodiment, further comprise an upper panel 22 attached to the base 20. The upper panel may be attached to the base 20 by means of a layer of adhesive 24, although other attachment means may also be used. The upper panel 22 has a perimeter 26 and defines a planar support surface 28 upon which the decorative flooring material 16 rests. The upper panel is constructed from a material selected from the group consisting of fiberboard, wood, composite, plywood, mineral wood, random wafer board, fiber glass, rock wool, open cell foam, closed celled foam, vinyl, plastic and melamine. There is greater variability possible when selecting a construction material for the upper panel, and the choice will be determined by the desired characteristics of the finished construction panel. For example, when manufacturing a construction panel for use as a subfloor panel, the upper panel will preferably be constructed from MDF (medium density fiberboard), whereas a construction panel for use in an acoustic installation application would more likely be constructed from traditional fiberboard.

The description of the present invention has been presented for purposes of illustration and description in order to best explain the principles of the invention and the practical application, and to enable others of ordinary skill in the art to understand the invention for various embodiments with various modifications as are suited to the particular use contemplated.

I claim:

1. A construction panel for interlocking connection to another construction panel and installation on a construction surface, said construction panel comprising:
   a base comprising a moisture barrier to inhibit migration of moisture from the construction surface, a perimeter of said base defined by a pair of opposed first connector edges and a pair of opposed second connector edges;
   the pair of opposed first connector edges comprising a first pair of releasable mating elements; and
   the pair of opposed second connector edges comprising a second pair of releasable mating elements;
   whereby the construction panel is connectable to the another construction panel by aligning one of the pair of opposed first connector edges to overlap one of a pair of opposed first connector edges of the another construction panel and pressing downward to mate with one of a pair of releasable mating elements of the another panel along the entirety of both construction panels,
   wherein the first pair of releasable mating elements comprises a first ridge defined by a first underside of one of the pair of opposed first connector edges, and a first channel defined by a second underside of the other of the pair of opposed first connector edges, wherein the second pair of releasable mating elements comprises a second ridge defined by a third underside of one of the pair of opposed second connector edges, and a second channel defined by a fourth underside of the other of the pair of opposed second connector edges, wherein a first end of the first channel of the pair of opposed first connector edges is set back from an end of the ridge defined on the underside of an adjacent one of the pair of the opposed second connector edges, whereby a first notch is formed to provide clearance for interlocking connection to the construction panel, and wherein a first end of the second channel of the pair of opposed second connector edges is set back from an end of the ridge defined on the underside of an adjacent one of the pair of the opposed first connector edges, whereby a second notch is formed on a diagonally opposite corner to provide clearance for interlocking connection to the another construction panel.

2. The construction panel of claim 1, wherein the base further comprises a plurality of projections extending from an underside thereof to support the base and to permit free drainage of water about the projections and between the base and the construction surface.

3. The construction panel of claim 2, wherein the base is rigid.

4. The construction panel of claim 1, further comprising an upper panel attached to said base, said upper panel having a perimeter and defining a planar support surface.

5. The construction panel of claim 4, wherein the upper panel is attached to the base by adhesive.

6. The construction panel of claim 4, wherein the upper panel is constructed from a material selected from the group consisting of fibreboard, composite, wood, plywood, random wafer board, MDF (medium density fiberboard), HOF (high density fiberboard) mineral wood, fiber glass, rock wool, open or closed celled foam, vinyl, plastic and melamine.

7. The construction panel of claim 6, wherein the base is constructed from a material selected from the group consisting of plastic, HOPE (high density polyethylene), HOPP (high density polypropylene), rubber, PVC, and acrylonitrile butadiene styrene (ABS).

8. The construction panel of claim 1, wherein the first pair of opposed connector edges and the second pair of opposed connector edges extend outwardly beyond the perimeter of the base.

9. A method of forming an interlocking connection of a construction panel to another construction panel for installation on a construction surface comprising the steps of:

providing a first construction panel having a base comprising a moisture barrier to inhibit migration of moisture from the construction surface, said base defining a pair of opposed first connector edges comprising a first pair of releasable mating elements, and a pair of opposed second connector edges comprising a second pair of releasable mating elements;

providing another construction panel having a second base comprising a moisture barrier to inhibit migration of moisture from the construction surface, said second base defining a pair of opposed first connector edges comprising a first pair of releasable mating elements, and a pair of opposed second connector edges comprising a second pair of releasable mating elements; and aligning one of the pair of opposed first connector edges to overlap one of a pair of opposed first connector edges of the another construction panel and pressing downward to mate the respective pairs of mating elements along the entirety of both construction panels, wherein the first pair of releasable mating elements comprises a first ridge defined by a first underside of one of the pair of opposed first connector edges, and a first channel defined by a second underside of the other of the pair of opposed first connector edges, wherein the second pair of releasable mating elements comprises a second ridge defined by a third underside of one of the pair of opposed second connector edges, and a second channel defined by a fourth underside of the other of the pair of opposed second connector edges, wherein a first end of the first channel of the pair of opposed first connector edges is set back from an end of the ridge defined on the underside of an adjacent one of the pair of the opposed second connector edges, whereby a first notch is formed to provide clearance for interlocking connection to the construction panel, and wherein a first end of the second channel of the pair of opposed second connector edges is set back from an end of the ridge defined on the underside of an adjacent one of the pair of the opposed first connector edges, whereby a second notch is formed on a diagonally opposite corner to provide clearance for interlocking connection to the another construction panel.

* * * * *